(12) United States Patent
Lee et al.

(10) Patent No.: US 10,679,568 B2
(45) Date of Patent: Jun. 9, 2020

(54) ELECTRONIC DEVICE FOR ACQUIRING BIOMETRIC INFORMATION USING DISPLAY LIGHT AND OPERATING METHOD THEREOF

(71) Applicant: Samsung Electronics Co., Ltd., Gyeonggi-do (KR)

(72) Inventors: Joon Gyu Lee, Gyeonggi-do (KR); Jaewan Kim, Gyeonggi-do (KR); Suyeon Kim, Gyeonggi-do (KR); Minsuk Uhm, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/103,327

(22) Filed: Aug. 14, 2018

(65) Prior Publication Data

US 2019/0057660 A1 Feb. 21, 2019

(30) Foreign Application Priority Data

Aug. 18, 2017 (KR) .......................... 10-2017-0104903

(51) Int. Cl.
*G09G 3/34* (2006.01)
*G06F 21/32* (2013.01)
(Continued)

(52) U.S. Cl.
CPC .......... *G09G 3/3413* (2013.01); *G06F 1/1626* (2013.01); *G06F 1/1637* (2013.01);
(Continued)

(58) Field of Classification Search
CPC .... G09G 3/3413; G09G 3/20; G09G 2360/14; G09G 2354/00; G09G 2320/0686;
(Continued)

(56) References Cited

U.S. PATENT DOCUMENTS 8,952,882 B2 * 2/2015 Lin ...................... G09G 3/3426
345/102
8,988,405 B2 3/2015 Endo
(Continued)

FOREIGN PATENT DOCUMENTS

CN 105827943 A 8/2016
EP 3 392 803 A2 10/2018
(Continued)

OTHER PUBLICATIONS

International Search Report dated Nov. 27, 2018.
European Search Report dated Jan. 14, 2019.
European Search Report dated Oct. 31, 2019.

*Primary Examiner* — Andrew Sasinowski
(74) *Attorney, Agent, or Firm* — Cha & Reiter, LLC

(57) ABSTRACT

The present disclosure relates to an electronic device for acquiring biometric information and an operating method thereof. An electronic device may include: a display including one or more pixels, each pixel including one or more subpixels, and the display configured to include a first area and a second area; a display driver IC configured to control driving of the display; a biometric sensor configured to at least partially overlap the second area, and configured to acquire biometric information; and a processor, wherein the processor is configured to: identify a request for acquisition of the biometric information; based at least in part on the request, identify state information related to the acquisition of the biometric information; and if the state information satisfies a specified condition, perform a first acquisition of the biometric information using light emitted through the second area, wherein the light emitted through the second area has a specified level of brightness, and wherein in performing the first acquisition of the biometric information, the processor may be further configured to adjust an inten-
(Continued)

sity of light emitted through the first area to be lower than the specified level of brightness.

20 Claims, 15 Drawing Sheets

(51) Int. Cl.
  *G09G 3/20* (2006.01)
  *G06K 9/00* (2006.01)
  *G06F 1/16* (2006.01)
  *G09G 5/10* (2006.01)
(52) U.S. Cl.
  CPC .......... *G06F 1/1643* (2013.01); *G06F 1/1684* (2013.01); *G06F 1/1696* (2013.01); *G06F 21/32* (2013.01); *G06K 9/0004* (2013.01); *G09G 3/20* (2013.01); *G09G 5/10* (2013.01); *G09G 2320/0626* (2013.01); *G09G 2320/0686* (2013.01); *G09G 2354/00* (2013.01); *G09G 2360/14* (2013.01); *G09G 2360/147* (2013.01)
(58) Field of Classification Search
  CPC .............. G09G 5/10; G09G 2360/147; G09G 2320/0626; G06F 1/1696; G06F 1/1643; G06F 1/1637; G06F 1/1626; G06F 1/1684; G06F 21/32; G06K 9/0004
  See application file for complete search history.

(56) References Cited

U.S. PATENT DOCUMENTS

| | | |
|---|---|---|
| 9,489,920 B2 | 11/2016 | Tusch |
| 9,711,493 B2* | 7/2017 | Lin .................... H01L 27/14679 |
| 9,799,264 B2 | 10/2017 | Eom et al. |
| 9,852,672 B2 | 12/2017 | Kim et al. |
| 2015/0348460 A1 | 12/2015 | Cox et al. |
| 2017/0068447 A1 | 3/2017 | Hong et al. |
| 2017/0147865 A1* | 5/2017 | Jensen ............... G06K 9/00053 |

FOREIGN PATENT DOCUMENTS

| | | |
|---|---|---|
| JP | 2011-118877 A | 6/2011 |
| JP | 2012-198540 A | 10/2012 |

* cited by examiner

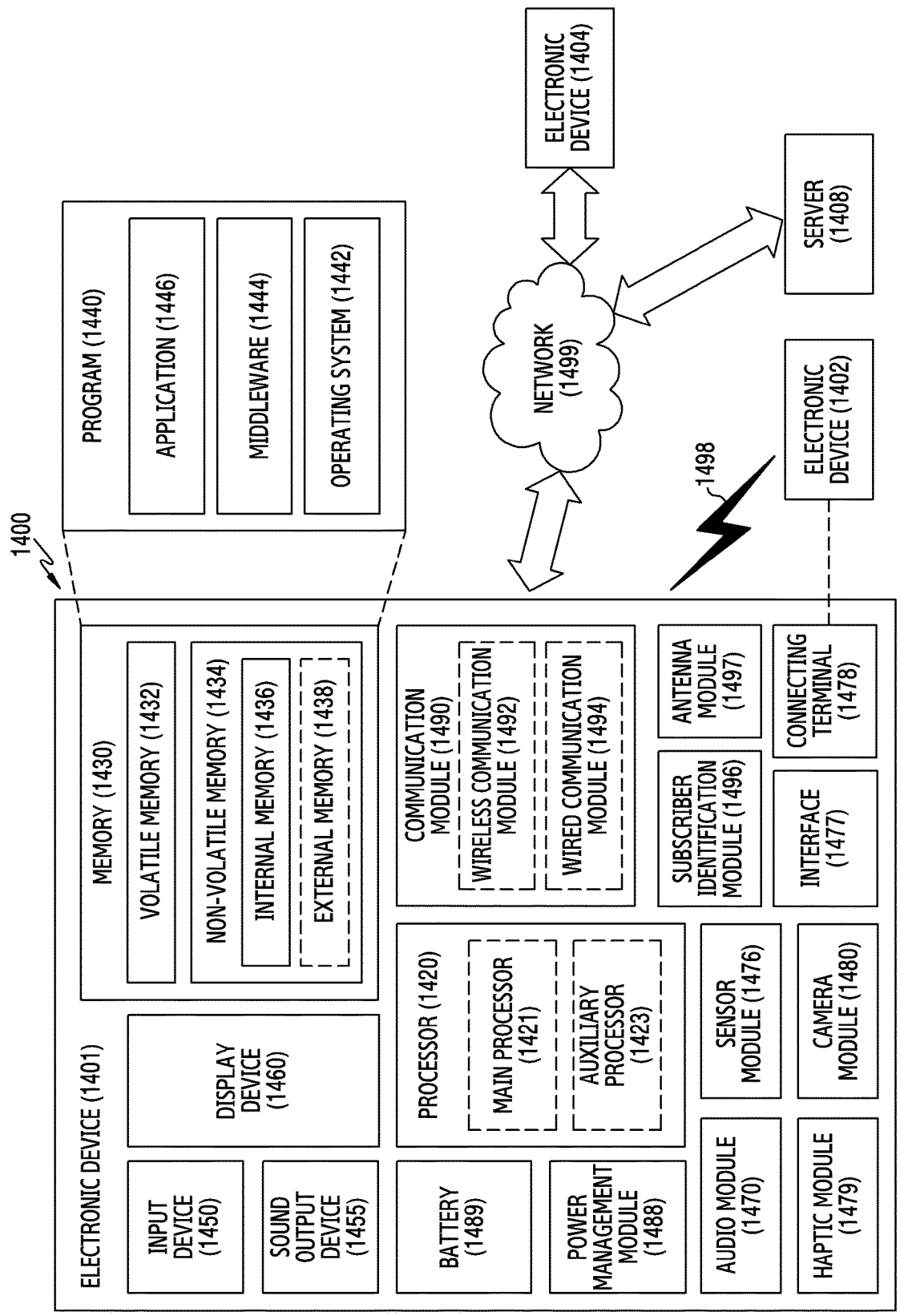

ELECTRONIC DEVICE FOR ACQUIRING BIOMETRIC INFORMATION USING DISPLAY LIGHT AND OPERATING METHOD THEREOF

CROSS-REFERENCE TO RELATED APPLICATION(S)

This application is based on and claims priority under 35 U.S.C. § 119 to Korean Patent Application No. 10-2017-0104903, filed on Aug. 18, 2017, in the Korean Intellectual Property Office, the disclosure of which is incorporated by reference herein in its entirety.

BACKGROUND

1) Field

Various embodiments of the present disclosure relate to an electronic device that utilizes light emitted by a display as a light source required for acquiring biometric information and an operating method thereof.

2) Description of Related Art

The above information is presented as background information only to assist with an understanding of the present disclosure. No determination has been made, and no assertion is made, as to whether any of the above might be applicable as prior art with regard to the present disclosure.

Electronic devices store a variety of personal information. Personal information must be protected from others. A method of protecting personal information requires user authentication. User authentication may be performed through biometrics of a user. Biometrics may include iris recognition, fingerprint recognition, facial recognition, palm print recognition, vein distribution recognition, and the like. Fingerprint recognition is widely used because it can ensure high security at low cost and because a fingerprint sensor can be miniaturized, which is advantageous when used in portable electronic devices.

In order to authenticate a user through fingerprint recognition, the electronic device may extract feature points from a fingerprint image obtained after sensing a fingerprint, and may compare the same with a pre-stored fingerprint template for analysis, thereby authenticating the user.

In order to acquire the fingerprint image for user authentication, the electronic device may irradiate light onto a part or all of the finger, and may sense light reflected by the same. In one or more of the disclosed embodiments below, the light irradiated to the finger may include the light emitted by a display.

SUMMARY

In order to obtain a fingerprint image, the electronic device may perform operations such that its display emits light at a specific brightness level or more. However, if a portion of the display is deteriorating, even at the same driving voltage levels, the brightness of the deteriorating portion of the display is lower than the brightness of the portion where no deterioration is occurring. Therefore, when deterioration of the display occurs, the specific brightness level for fingerprint recognition may not be obtained. Accordingly, the acquisition of fingerprint images may be more difficult.

Electronic devices and methods, according to various embodiments of present disclosure, may improve the acquisition of fingerprint images even when deterioration of the display is occurring.

An electronic device, according to an embodiment of the present disclosure, may include: a display including one or more pixels, each pixel including one or more subpixels, and the display configured to include a first area and a second area; a display driver IC configured to control driving of the display; a biometric sensor configured to at least partially overlap the second area, and configured to acquire biometric information; and a processor, wherein the processor may be configured to: identify a request for acquisition of the biometric information; based at least in part on the request, identify state information related to the acquisition of the biometric information; and if the state information satisfies a specified condition, perform a first acquisition of the biometric information using light emitted through the second area, wherein the light emitted through the second area has a specified level of brightness, and wherein in performing the first acquisition of the biometric information, the processor may be further configured to adjust an intensity of light emitted through the first area to be lower than the specified level of brightness.

A method of operating an electronic device, according to an embodiment of the present disclosure, may include: identifying a request for acquisition of biometric information; based at least in part on the request, identifying state information related to the acquisition of the biometric information; and if the state information satisfies a specified condition, performing a first acquisition of the biometric information using light emitted through a second area of a display, wherein the light emitted through the second area has a specified level of brightness, and wherein the performing of the first acquisition may include adjusting an intensity of light emitted through a first area of the display to be lower than the specified level of brightness.

A computer-readable storage medium, according to various embodiments of the present disclosure, may store a program for executing the operations of: identifying a request for acquisition of biometric information; based at least in part on the request, identifying state information related to the acquisition of the biometric information; if the state information satisfies a specified condition, performing a first acquisition of the biometric information using light emitted through a second area of a display; and if the state information satisfies another specified condition, performing a second acquisition of the biometric information using the light emitted through the second area of the display, wherein the light emitted through the second area has a specified level of brightness, and the performing of the first acquisition of the biometric information may include adjusting an intensity of light emitted through a first area of the display to be lower than the specified level of brightness.

Electronic devices and operating methods thereof, according to various embodiments of present disclosure, can output light of a specific level of brightness in a sensing area of the biometric sensor by generating a load effect between a non-sensing area and the sensing area. Using the load effect, the specific level of brightness may be obtained even when the particular pixels in the sensing area have deteriorated.

BRIEF DESCRIPTION OF THE DRAWINGS

The above and other aspects, features, and advantages, of certain embodiments of the present disclosure will be more apparent from the following description taken in conjunction with the accompanying drawings, in which:

FIG. 14 is a block diagram of an electronic device in a network environment for acquiring biometric information using display light according to an embodiment of the present disclosure.

DETAILED DESCRIPTION

Hereinafter, the operating principle of the present disclosure will be described in detail with reference to the accompanying drawings. In describing the present disclosure below, a detailed description of known configurations or functions incorporated herein will be omitted when it is determined that the detailed description thereof may unnecessarily obscure the subject matter of the present disclosure. The terms which will be described below are terms defined in consideration of the functions in the present disclosure, and may be different from their customary meanings. Therefore, the definitions of the terms should be made based on the contents of the specification.

Figure 1A:
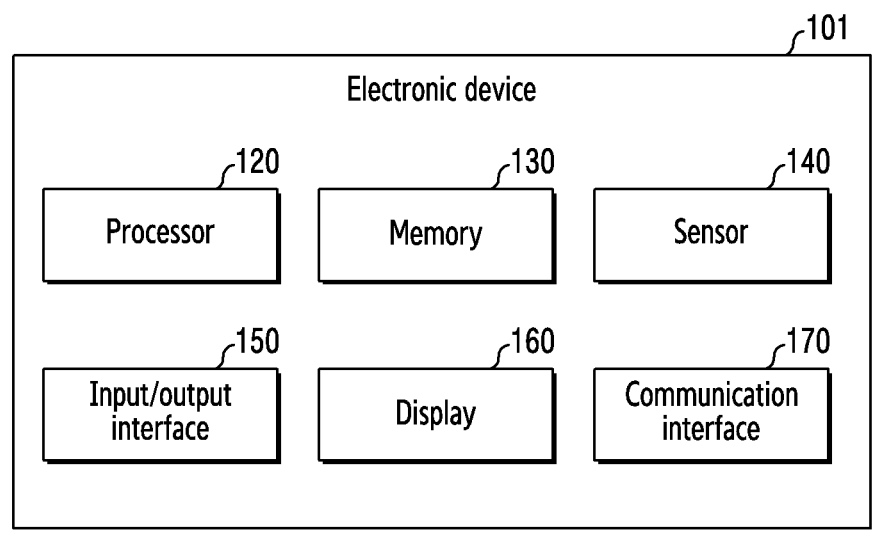
FIG. 1A is a block diagram illustrating a configuration of an electronic device according to an embodiment of the present disclosure.
Figure 1B:
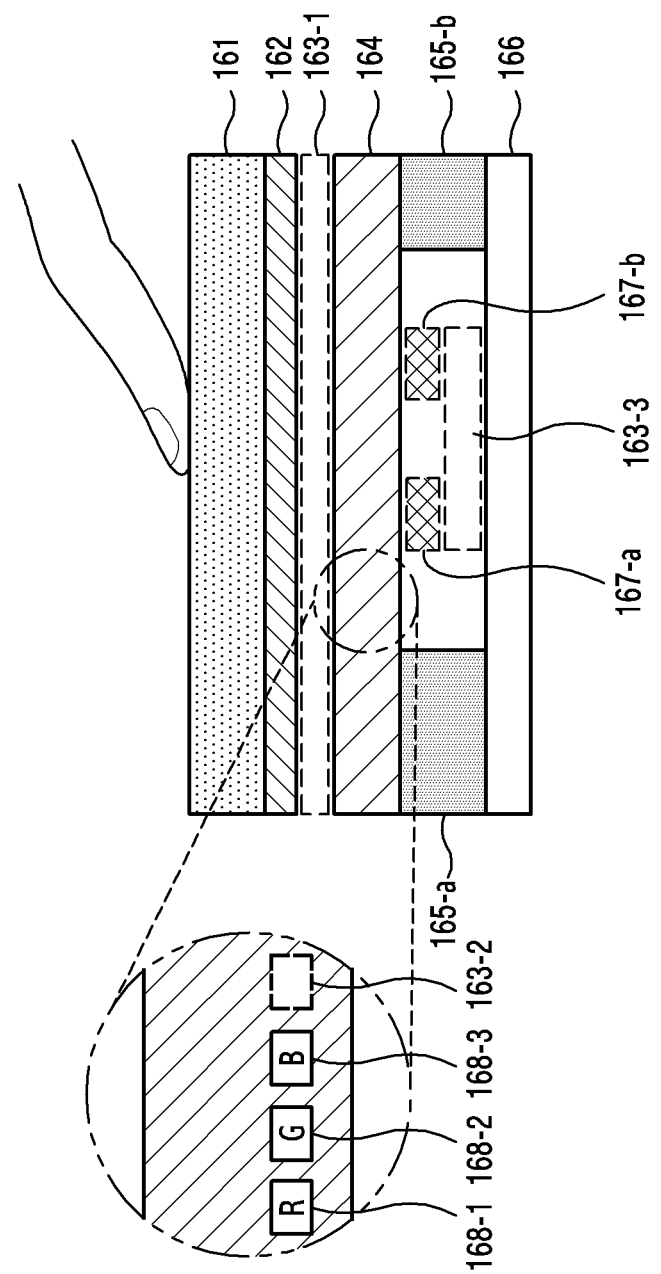
FIG. 1B is a view illustrating a structure of a display of an electronic device according to an embodiment of the present disclosure.

FIG. 1A is a block diagram illustrating a configuration of an electronic device 101 according to an embodiment of the present disclosure, and FIG. 1B is a view illustrating a structure of a display 160 in an electronic device 101 according to an embodiment of the present disclosure.

Referring to FIG. 1A, the electronic device 101 may include a processor 120, a memory 130, a sensor 140, an input/output interface 150, a display 160, and a communication interface 170. In some embodiments, the electronic device 101 may exclude at least one of the elements, or may further add other elements thereto.

The processor 120 may include at least one of a central processing unit (CPU), an application processor (AP), a communication processor (CP), or an image signal processor (ISP). The processor 120, for example, may perform operations or data processing in relation to control and/or communication of one or more other elements of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 120 may perform a process such that biometric authentication for a user is executed according to a specified event. For example, the specified event may relate to a lock screen release, electronic payment-based payment processing, financial transaction via mobile banking, execution of a specified authentication application, and the like. The biometric authentication may include fingerprint authentication.

According to an embodiment, the processor 120 may control the operation of the display 160 such that the brightness of a sensing area for acquiring biometric information is maintained at a specific level or more. For example, the control for the operation of the display 160 may include generating a load effect in at least a portion of the sensing area. The load effect may be where at least a partial area of the display 160 corresponding to the sensing area is supplied with a larger current than the current supplied the non-sensing area of the display 160. For example, generating the load effect may include outputting content in grayscale in the non-sensing area of the display 160.

The memory 130 may include a volatile and/or non-volatile memory. The memory 130, for example, may store commands or data in relation to one or more other elements of the electronic device 101. The memory 130 may store information necessary for biometric authentication. For example, the information necessary for biometric authentication may include information on at least one program that involves a biometric authentication procedure. For example, a program involving biometric authentication procedure may include a mobile banking application, an electronic payment application, or some other authentication application. As another example, the information necessary for biometric authentication may include a reference template registered by the user. For example, the reference template may include a reference fingerprint image for authenticating acquired fingerprint information (e.g., a fingerprint image). In addition, the memory 130 may store operation information on at least one pixel included in the display 160. For example, the operation information on the pixel may include a light emission time of pixels corresponding to the sensing area.

According to an embodiment, the memory 130 may store software and/or programs. The program 1440 may include, for example, a kernel, middleware, an Application Programming Interface (API), and/or application programs (or "applications"), some of which are shown in FIG. 14. At least some of the kernel, the middleware, and the API may be referred to as an Operating System (OS).

The kernel may control or manage system resources (e.g., the processor 120, or the memory 130) used for performing operations or functions implemented in the other programs (e.g., the middleware, the API, or the application programs). Furthermore, in controlling and managing system resources, the kernel may provide an interface through which the middleware, the API, or the application programs may access the individual components of the electronic device 101.

The middleware, for example, may serve as an intermediary for allowing the API or the application programs to communicate with the kernel to exchange data.

Also, the middleware may process one or more task requests received from the application programs according to priorities thereof. For example, the middleware may assign priorities for using the system resources (e.g., the processor 120, the memory 130, or the like) of the electronic device 101, to at least one of the application programs. For example, the middleware may perform scheduling or loading balancing on the one or more task requests by processing the one or more task requests according to the priorities assigned thereto.

The API is an interface through which the applications control functions provided from the kernel or the middleware, and may include, for example, at least one interface or function (e.g., instruction) for file control, window control, image processing, character control, and the like.

The sensor 140 may include at least one biometric sensor. According to an embodiment, at least one biometric sensor may recognize the physical or behavioral characteristics of a user. For example, at least one biometric sensor may include at least one of a fingerprint recognition sensor, an image sensor, an iris recognition sensor, a face recognition sensor, a speech recognition sensor, and a heart-rate measurement sensor. In addition, the sensor 140 may include at least one of a touch sensor and an illuminance sensor.

The input/output interface 150 may transfer commands or data input from a user or other external devices to other elements of the electronic device 101, or may transfer commands or data received from other elements of the electronic device 101 to the user or other external devices. For example, the input/output interface 150 may include at least one physical button such as a home button, a power button, and a volume control button. For example, the input/output interface 150 may include a speaker for outputting audio signals and a microphone for collecting audio signals.

The display 160 may display a variety of content (e.g., text, images, videos, icons, and/or symbols) to the user. For example, the display 160 may include a liquid crystal display (LCD), a light-emitting diode (LED) display, an organic light-emitting diode (OLED) display, or a microelectromechanical systems (MEMS) display, or an electronic paper display. For example, the display 160 may include a touch screen. For example, the display 160 may receive a touch input, a gesture input, a proximity input, or a hovering input using an electronic pen or a user's body part.

According to various embodiments, as shown in FIG. 1B, the display 160 may include at least one sensor (e.g., the sensor 140) for sensing biometric information of a user. In addition, the at least one sensor may include at least one biometric sensor (e.g., a fingerprint recognition sensor). The biometric sensor may detect the light reflected by at least a part (e.g., a finger) of a user's body in contact with a biometric information sensing area, thereby acquiring biometric information (e.g., a fingerprint image). For example, the reflected light may be the light that is emitted by driving the display 160 and is reflected by the body. Also, the area where the biometric sensor is disposed may overlap, at least in part, the biometric information sensing area.

According to an embodiment, the biometric sensor may be disposed at various positions around the display panel 164. For example, as indicated by the reference numeral 163-1 in FIG. 1B, the biometric sensor may be disposed between a window 161 (e.g., a front plate, a glass plate, or the like) and a display panel 164. The biometric sensor may be disposed between the window 161 and the display panel 164 so as to be attached thereto by means of an optical adhesive member 162 (e.g., OCA (Optically Clear Adhesive) or PSA (Pressure Sensitive Adhesive)). In this case, the biometric sensor may include a photo-detecting member (e.g., a photo-sensor). The photo-detecting member may receive the light reflected by a user's finger that is approaching the window 161. The reflected light may be light emitted from the display panel 164 and is reflected by the user's finger. As another example, as indicated by the reference numeral 163-2 in FIG. 1B, the biometric sensor may be disposed in the display panel 164. The biometric sensor may be disposed around at least one pixel that includes one or more subpixels (e.g., RGB elements) 168-1, 168-2, and 168-3 in the display panel 164. The biometric sensor may include a photo-detecting member (e.g., a photo diode (PD)) formed along with one or more subpixels 168-1, 168-2, and 168-3. The photo-detecting member may receive the light reflected by a fingerprint formed on a finger of the user approaching the window 161. The reflected light may be the light emitted from one or more subpixels 168-1, 168-2, and 168-3 of the display panel 164 and is reflected by the fingerprint. As another example, as indicated by the reference numeral 163-3 in FIG. 1B, the biometric sensor may be disposed on a first surface (e.g., the back surface) of the display panel 164. The biometric sensor may be disposed between the display panel 164 and a PCB 166 that is disposed under the display panel 164. The biometric sensor may be disposed in a space defined by one or more structures 165-a and 165-b (e.g., housings, bushings, etc.) interposed between the display panel 164 and the PCB 166. One or more structures 165-a and 165-b may include hermetic or sealing structures to protect the biometric sensor. One or more buffering members 167-a and 167-b (e.g., sponges, rubber, urethane, or silicone) may be interposed between the display panel 164 and the biometric sensor 163-3. The buffering members 167-a and 167-b may protect the biometric sensor 163-3 by buffering the sensor against the display panel 164. In addition, the buffering members 167-a and 167-b may prevent dust or other foreign objects from coming into contact with the biometric sensor.

The communication interface 170 may establish communication between the electronic device 101 and an external device. For example, the communication interface 170 may be connected to a network via wireless communication or wired communication to thus communicate with an external device.

According to an embodiment, the wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. According to an embodiment, the wireless communication may include at least one of, for example, Wireless Fidelity (WiFi), Light Fidelity (LiFi), Bluetooth, Bluetooth low energy (BLE), Zigbee, Near Field Communication (NFC), Magnetic Secure Transmission (MST), Radio Frequency (RF) and Body Area Network (BAN). According to an embodiment, the wireless communication may include Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo) or the like. Hereinafter, in the present disclosure, the "GPS" may be interchangeably used with the "GNSS". According to an embodiment, the wired communication may include at least one of, for example, a Universal Serial Bus (USB), a High Definition Multimedia Interface (HDMI), Recommended Standard 232 (RS-232), a power line communication and a Plain Old Telephone Service (POTS). The network may include at least one of a communication network such as a computer network (e.g., a LAN or a WAN), the Internet, and a telephone network.

According to an embodiment, an electronic device 101 may include: a display (e.g., the display 160 in FIG. 1A) may include one or more pixels, each pixel including one or more subpixels, and the display configured to include a first area and a second area; a display driver IC configured to control driving of the display; a biometric sensor (e.g., the sensor 140 in FIG. 1A) configured to at least partially overlap the second area, and configured to acquire biometric information; and a processor (e.g., the processor 120 in FIG. 1A), wherein the processor may be configured to: identify a request for acquisition of the biometric information; based at least in part on the request, identify state information related to the acquisition of the biometric information; and if the state information satisfies a specified condition, perform a first acquisition of the biometric information using light emitted through the second area, wherein the light emitted through the second area has a specified level of brightness and wherein in performing the first acquisition of the biometric information, the processor may be further configured to adjust an intensity of light emitted through the first area to be lower than the specified level of brightness.

According to an embodiment, the processor may be further configured to, if the state information satisfies another specified condition, perform a second acquisition of the biometric information using the light emitted through the second area.

According to an embodiment, the processor may be further configured to control the display driver IC to drive the first area to emit light corresponding to a specified color during the first acquisition of the biometric information.

According to an embodiment, the processor may be further configured to adjust the intensity of the light emitted through the first area by applying a specified grayscale value to the first area during the first acquisition of the biometric information.

According to an embodiment, the processor may be further configured to adjust the intensity of the light emitted through the first area by changing a grayscale value applied to some of the pixels in the first area during the first acquisition of the biometric information.

According to an embodiment, during the first acquisition of the biometric information, the processor may be further configured to: select at least one pixel in the first area; and adjust the intensity of the light emitted through the first area by applying a specified grayscale value to the selected pixel.

According to an embodiment, the state information may include information related to at least one of a luminescence intensity of at least one pixel of the display, a temperature of the at least one pixel, or an ambient environmental brightness around the electronic device.

According to an embodiment, the processor may be further configured to select a location of the second area based on a driving time for pixels in the second area.

According to an embodiment, the processor may be further configured to output guide information corresponding to the selected location of the second area.

Figure 2:
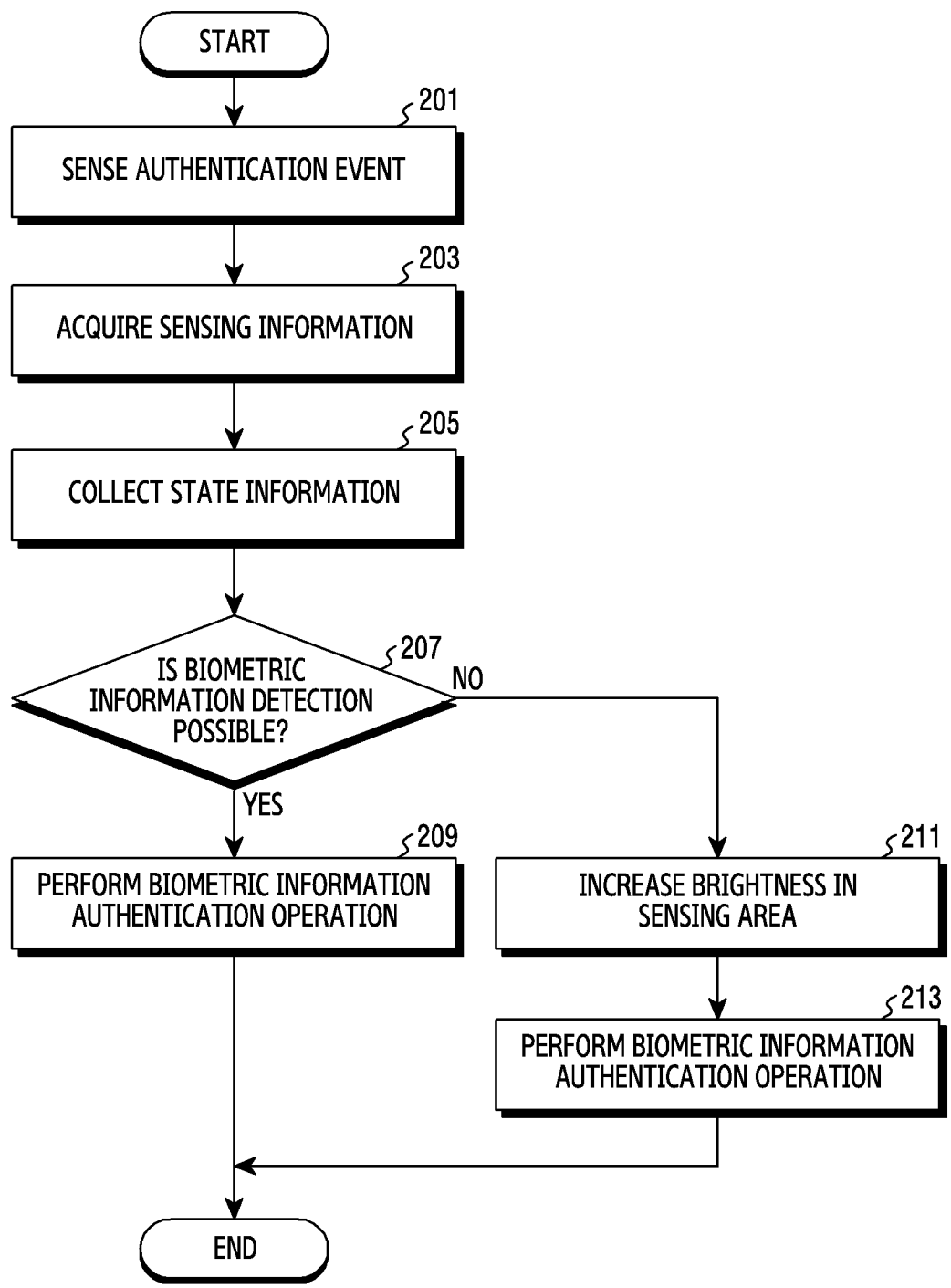
FIG. 2 is a flowchart illustrating a procedure for acquiring biometric information in an electronic device according to an embodiment of the present disclosure.

FIG. 2 is a flowchart illustrating a procedure for acquiring biometric information in an electronic device 101 according to an embodiment of the present disclosure.

Referring to FIG. 2, an electronic device 101 (or the processor 120) may sense a user authentication event in operation 201. According to an embodiment, the user authentication event may be related to a lock screen release process, a payment process based on electronic payment, or a financial transaction process via mobile banking.

In operation 203, the electronic device 101 may acquire sensing information through at least a portion of the sensing area. According to an embodiment, the acquisition of the sensing information may include detecting an object (e.g., at least a part of the user's body such as a finger) that approaches or comes into contact with at least a portion of the sensing area. In addition, the sensing area may include at least a portion of the display 160. For example, the sensing area may be disposed to occupy a portion of the display 160 so as to be included in the range of finger movement of the user holding the electronic device or so as to facilitate accessibility of the user's finger. As another example, the sensing area may be disposed to occupy the entire area of the display 160 in order to extend the sensing range for the biometric information.

In operation 205, the electronic device 101 may collect state information. According to an embodiment, the state information may be associated with factors that affect the detection of biometric information. For example, the electronic device 101 may collect state information associated with luminescence intensity, humidity, and/or temperature for at least some of the pixels of the display 160 (e.g., pixels corresponding to the sensing area). In addition, the electronic device 101 may collect, as state information, the ambient environmental brightness around the electronic device 101.

In one example, in order to collect the luminescence intensity for at least some of the pixels of the display 160 as state information, the electronic device 101 may control at least some of the pixels of the display 160 to emit light. In addition, the electronic device 101 may sense the light reflected by at least a part of a body (e.g., a finger) to thus determine the luminescence intensity of at least some pixels. In another example, in order to collect the temperature or humidity for the pixels of the display 160, the electronic device 101 may measure the temperature or humidity of at least some pixels of the display 160 by means of a temperature or humidity sensor. In yet another example, in order to collect the information regarding ambient environmental brightness, the electronic device 101 may check the surrounding illuminance of the electronic device in real time or in a specified period using an illuminance sensor.

In operation 207, the electronic device 101 may determine whether or not detection of biometric information is possible. According to an embodiment, the detectability of biometric information may be determined based on the state information. For example, in the case where the collected state information includes the luminescence intensity for at least some of the pixels of the display 160, if these pixels of the display 160 emit light below a specific brightness level, the electronic device 101 may determine that detection of biometric information is impossible. In addition, in the case where the collected state information includes the temperature or humidity of the pixels of the display 160, if the identified temperature level is out of a pre-defined temperature range in which detection of biometric information is possible, or if the identified humidity level is out of a pre-defined humidity range in which detection of biometric information is possible, the electronic device 101 may determine that detection of biometric information is impossible.

If it is determined that detection of biometric information is possible, the electronic device 101 may perform a biometric information authentication operation in operation 209. According to an embodiment, the electronic device 101 may detect the biometric information (e.g., a fingerprint image) using, as a light source, the light of the display 160 (e.g., the light emitted from the pixels). The electronic device can then compare the biometric information with a registered reference template of the user. For example, the comparing of the biometric information with a registered reference template of the user may include extracting feature points (e.g., bifurcations of ridgelines, endpoints of ridgelines, or the like) from the detected biometric information or analyzing a pattern of the biometric information and determining whether or not the feature points or the biometric information pattern matches the stored reference template.

If it is determined that detection of biometric information is impossible, the electronic device 101 may increase the brightness of the sensing area in operation 211. According to an embodiment, the brightness of the sensing area may be increased by generating a load effect between the non-sensing area and the sensing area. The load effect may be where the current flowing through each pixel included in the display 160 undergoes a voltage drop. For example, the electronic device 101, in order to increase the brightness, may generate a load effect such that at least some pixels corresponding to the sensing area are less affected by the voltage drop. Thus, the electronic device 101 may increase the brightness of the sensing area by adjusting the intensity of light emitted through the pixels of the non-sensing area to be lower than a specified level of brightness. In addition, the electronic device 101 may emit light corresponding to a specified color through the pixels in the non-sensing area, thereby increasing the brightness of the sensing area. For example, the electronic device 101 may perform a process such that the pixels of the non-sensing area emit light of a darker color than the light emitted from the pixels of the sensing area. As another example, the electronic device 101 may perform a process such that the pixels of the display 160 corresponding to the sensing area emit light corresponding to a white color and the pixels of the display 160 corresponding to the non-sensing area emit light corresponding to a darker color.

If the brightness of the sensing area is increased, the electronic device 101 may perform a biometric information authentication operation in operation 213. As disclosed above, the biometric information authentication operation includes an operation of comparing the biometric information (e.g., a fingerprint image) acquired at increased brightness with a registered reference template of the user.

Figure 3:
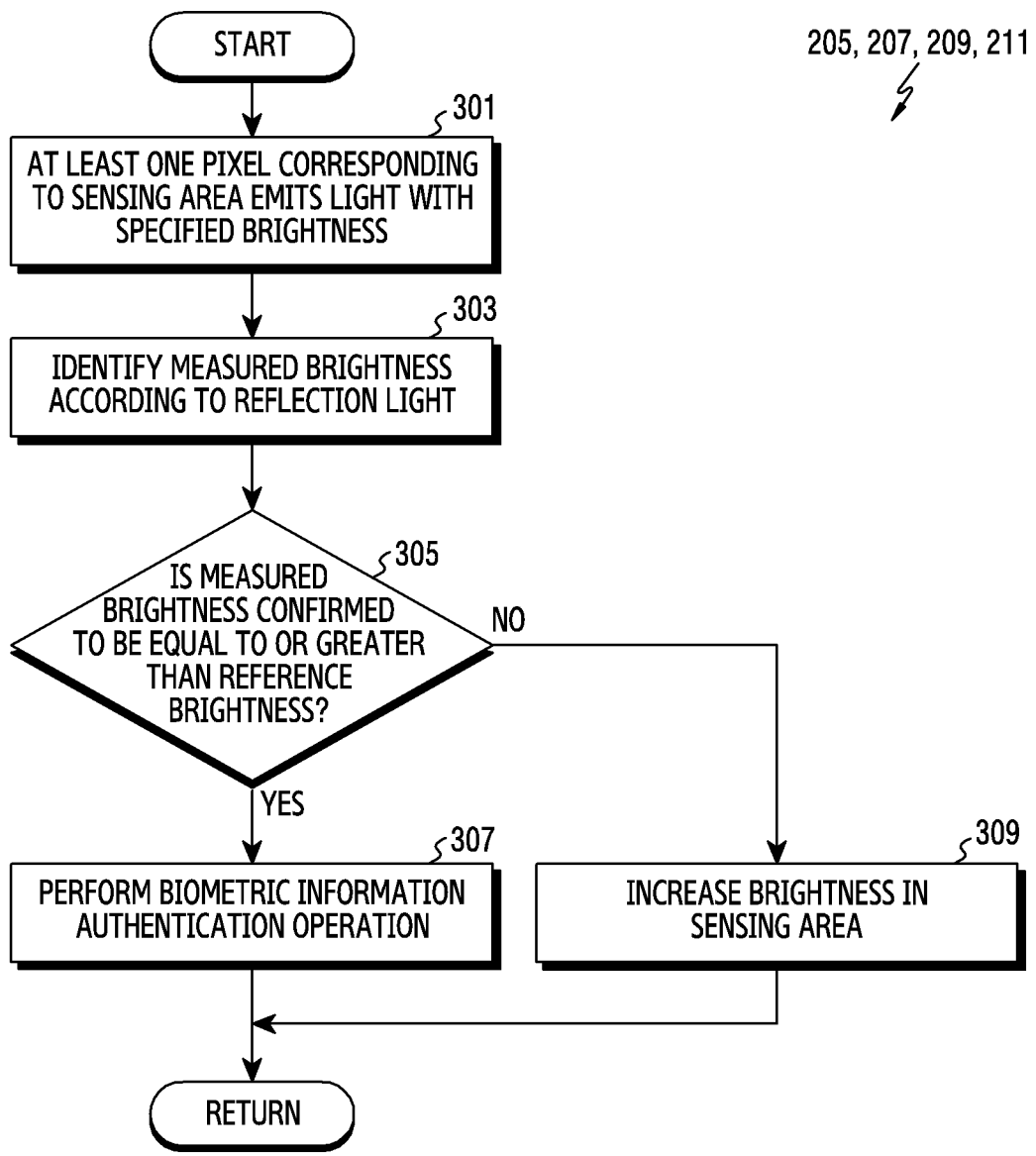
FIG. 3 is a flowchart illustrating a procedure for performing a biometric information authentication operation in an electronic device according to an embodiment of the present disclosure.
Figure 4:
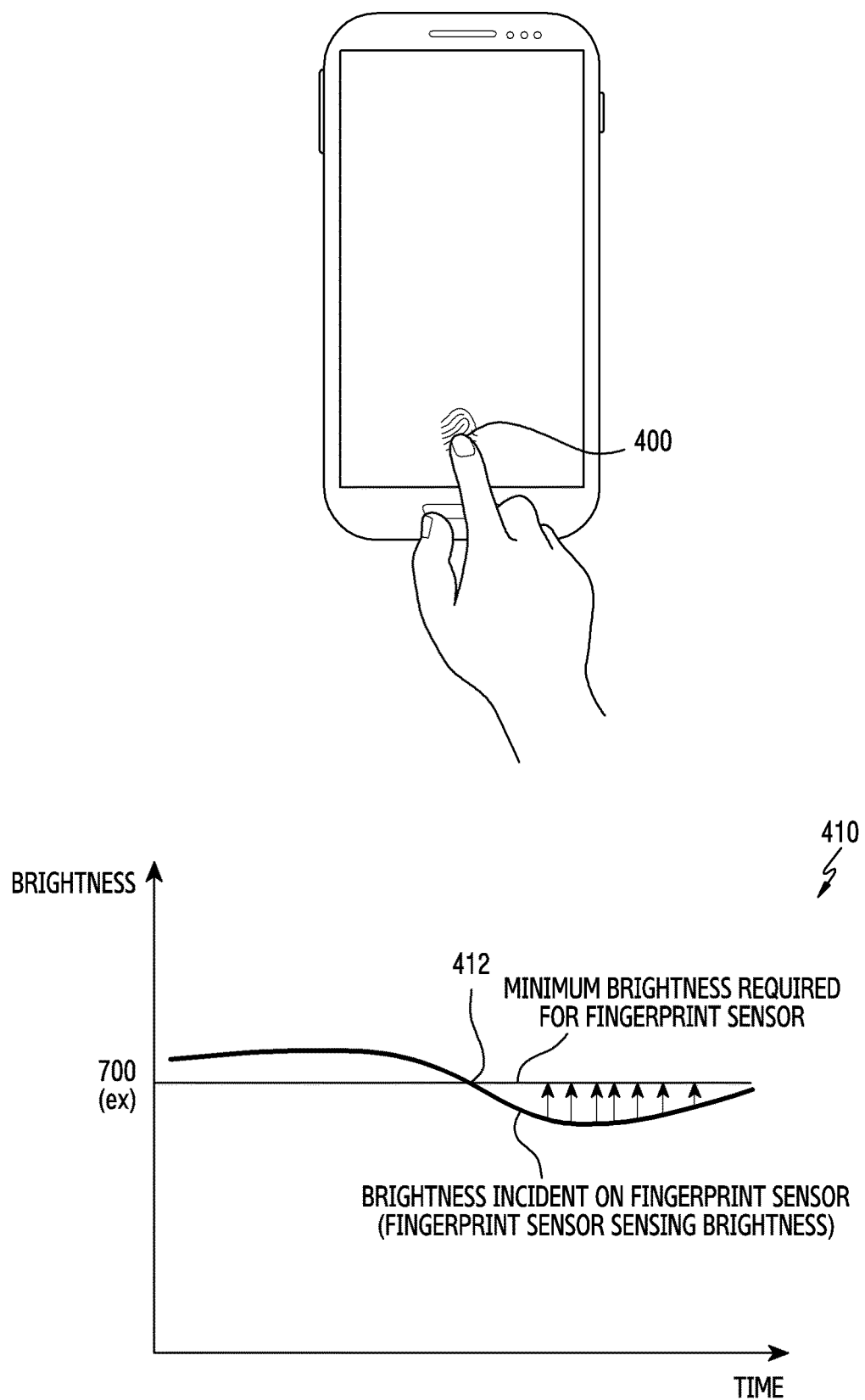
FIG. 4 is a view and a graph illustrating a case where the brightness of a sensing area in an electronic device is increased, according to an embodiment of the present disclosure.

FIG. 3 is a flowchart illustrating a procedure for performing a biometric information authentication operation in an electronic device 101 according to an embodiment of the present disclosure. FIG. 4 is a view and a graph illustrating a case where the brightness of a sensing area is increased. According to an embodiment, the procedures shown in FIGS. 3 and 4 may be detailed operations of operations 205 to 211 shown in FIG. 2.

Referring to FIG. 3, the electronic device 101 (or the processor 120) may perform a process such that at least one pixel corresponding to a sensing area emits light at a specified level of brightness in operation 301. According to an embodiment, as shown in FIG. 4, when sensing information on at least a part 400 of the user's body is acquired, at least one pixel may be operated to emit light with a specified level of brightness. For example, emitting light at the specified level of brightness may include an operation in which at least one pixel corresponding to the sensing area, based on the screen brightness set by the user, emits light. As another example, emitting light at the specified level of brightness may include an operation in which at least one pixel corresponding to the sensing area, based on the surrounding illuminance, emits light. In this example, at least one pixel corresponding to the sensing area may emit light with a high level of brightness when the surrounding illuminance is high, and the at least one pixel corresponding to the sensing area may emit light with a low level of brightness when the surrounding illuminance is low.

In operation 303, the electronic device 101 may identify measured brightness according to the light reflected from the body. In other words, the measured brightness may be the brightness of the light incident on a light receiver of the biometric sensor, i.e., the light incident on the light receiver may be the light that is generated by the at least one pixel in the sensing area and is reflected by at least a part of a body.

In operation 305, the electronic device 101 may determine whether or not the measured brightness is equal to or greater than a reference level of brightness. According to an embodiment, the reference level of brightness may be the minimum level of brightness needed to detect normal biometric information. For example, information regarding the reference level of brightness may be stored in the electronic device 101 (e.g., the memory 130).

If the measured brightness is equal to or greater than a reference level of brightness, the electronic device 101 may perform a biometric information authentication operation in operation 307. According to an embodiment, the biometric information authentication operation may correspond to operation 207 shown in FIG. 2. For example, the electronic device 101, as indicated by a reference numeral 410 in FIG. 4, may perform biometric information authentication using the light of the display 160 having a specified level of brightness until the measured brightness is confirmed to be lower than a reference level of brightness (e.g., 700 nits) (see 412).

If the measured brightness is confirmed to be lower than the reference level of brightness, the electronic device 101 may increase the brightness of the sensing area in operation 309. According to an embodiment, the operation of increasing the brightness of the sensing area may correspond to operation 209 shown in FIG. 2. In addition, based on the increased brightness of the sensing area, the electronic device 101 may perform biometric information authentication. For example, when the measured brightness is confirmed to be lower than the reference level of brightness (e.g., 700 nits), the electronic device 101 may increase the brightness at the sensing area and perform biometric information authentication, as shown in FIG. 4 (see 410).

According to an embodiment, when the brightness of the sensing area is increased (e.g., operation 309), the electronic device 101 may store information regarding the increased brightness value of the sensing area in the electronic device 101 (e.g. the memory 130) or an external device. When the electronic device 101 emits light through the sensing area for the next sensing operation (e.g., operation 301), the electronic device 101, based on the increased brightness value of the sensing area, may determine the brightness for the sensing area.

Figure 5:
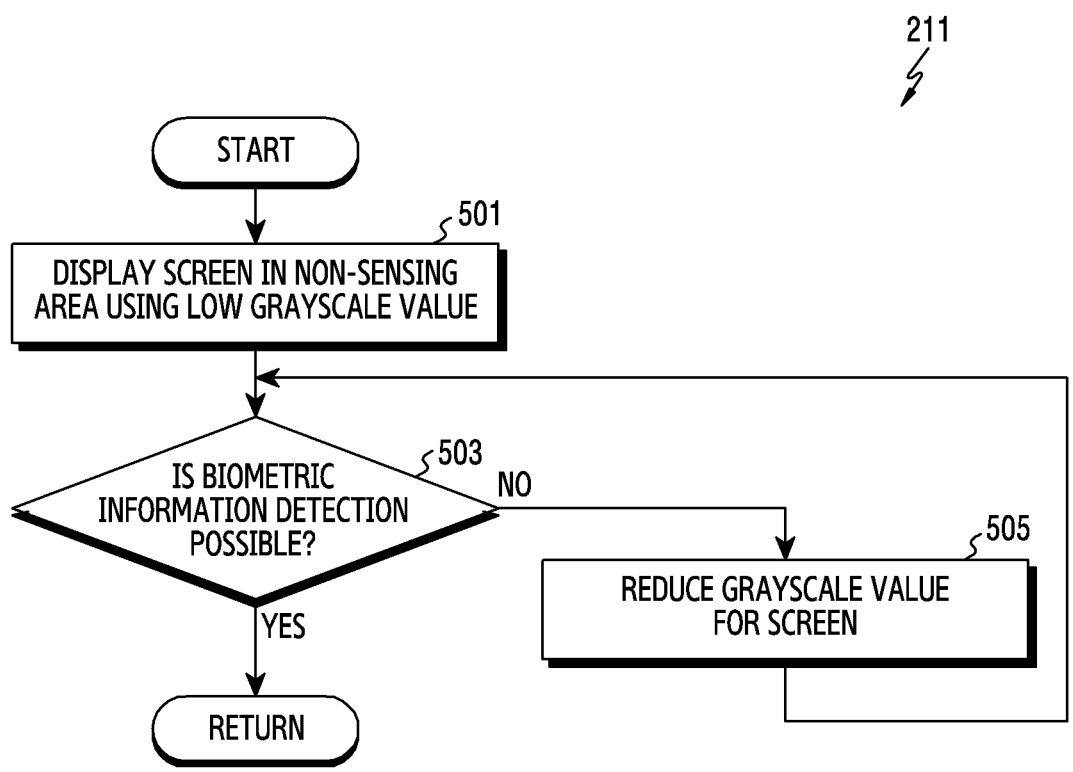
FIG. 5 is a flowchart illustrating a procedure for increasing the brightness of a sensing area in an electronic device according to an embodiment of the present disclosure.

FIG. 5 is a flowchart illustrating a procedure for increasing the brightness of a sensing area in an electronic device 101 according to an embodiment of the present disclosure. According to an embodiment, the procedure shown in FIG. 5 may be detailed operations of operation 211 shown in FIG. 2.

Referring to FIG. 5, the electronic device 101 (or the processor 120) may display (e.g., output) a screen (e.g., a background image) in a non-sensing area using low grayscale values in operation 501. For example, at least one pixel corresponding to the non-sensing area may emit light at a specified low-grayscale value such that the screen in the non-sensing area is relatively dark compared to the sensing area. In this case, the sensing area, using he load effect, may emit light at a high level of brightness.

In operation 503, the electronic device 101 may determine whether or not detection of biometric information is possible. According to an embodiment, the detectability of biometric information may be determined based on whether or not light having a brightness of a specific level or more is reflected by the user's body when a screen is displayed in the non-sensing area using low grayscale values. For example, when light having a brightness of a specific level or more is reflected by the body due to the load effect, the electronic device 101 may determine that detection of biometric information is possible. However, if light having a brightness lower than the specific level is reflected by the body even when the load effect is generated, the electronic device 101 may determine that detection of biometric information is impossible.

If it is determined that detection of biometric information is possible, the electronic device 101 may perform biometric information authentication. For example, the biometric information authentication may include acquiring biometric information using the emitted light with increased brightness as a light source. The biometric information authentication may also include an operation of comparing the acquired biometric information with a registered reference template of a user.

If it is determined that detection of biometric information is impossible, the electronic device 101 may perform an operation of reducing the grayscale value for the screen in operation 505. According to an embodiment, this operation may include outputting a darker image in the non-sensing area using lower grayscale values. In this case, the sensing area may emit light having increased brightness due to the increased load effect as the grayscale value in the non-sensing area is reduced.

When the grayscale value for the non-sensing area is reduced, the electronic device 101 may determine whether or not detection of biometric information is possible, and based on the determination result, may perform biometric information authentication. For example, when biometric information is acquired using the emitted light with increased brightness as a light source, the electronic device 101 may perform biometric information authentication. In addition, when the electronic device 101 cannot acquire the biometric information using the emitted light with increased brightness, the electronic device 101 may repeatedly perform the operation of reducing the grayscale value for the screen in the non-sensing area.

According to an embodiment, when the grayscale value for the screen in the non-sensing area is reduced (e.g., operation 505), the electronic device 101 may store the reduced grayscale value in the electronic device 101 (e.g., the memory 130). Then when the electronic device 101 performs the operation of displaying a screen in the non-sensing area for the next sensing operation (e.g., operation 501), the electronic device 101 may use the reduced grayscale value, which has been previously stored, as the grayscale value used for displaying the screen in the non-sensing area.

Figure 6:
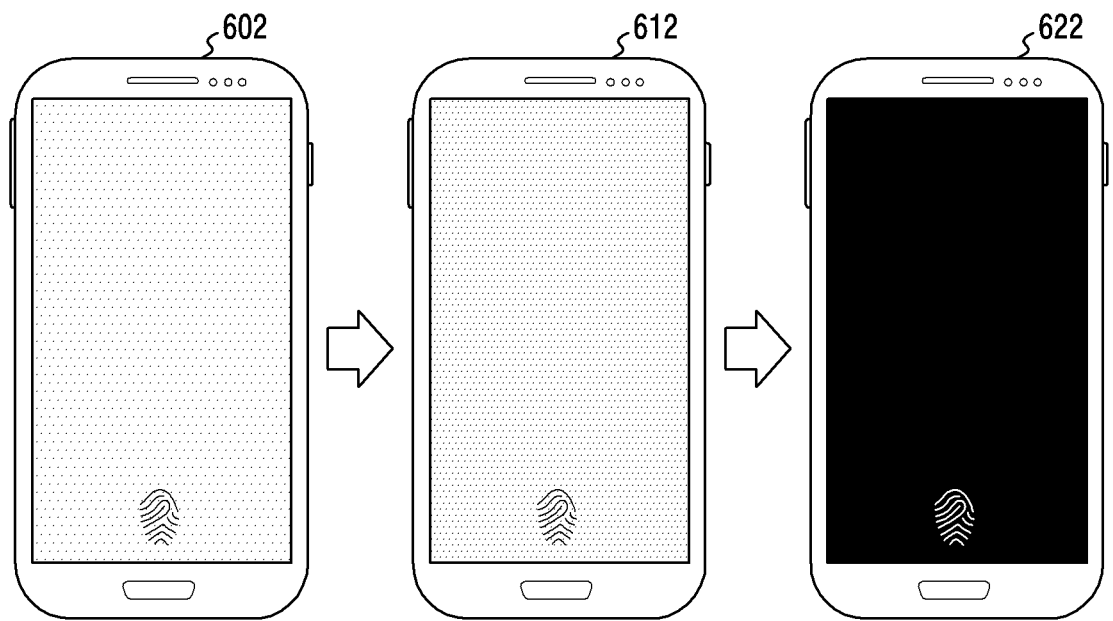
FIG. 6 is a view and a graph illustrating a case where a grayscale value of a screen displayed in a non-sensing area is changed in order to increase the brightness of a sensing area in an electronic device according to an embodiment of the present disclosure.
Figure 6:
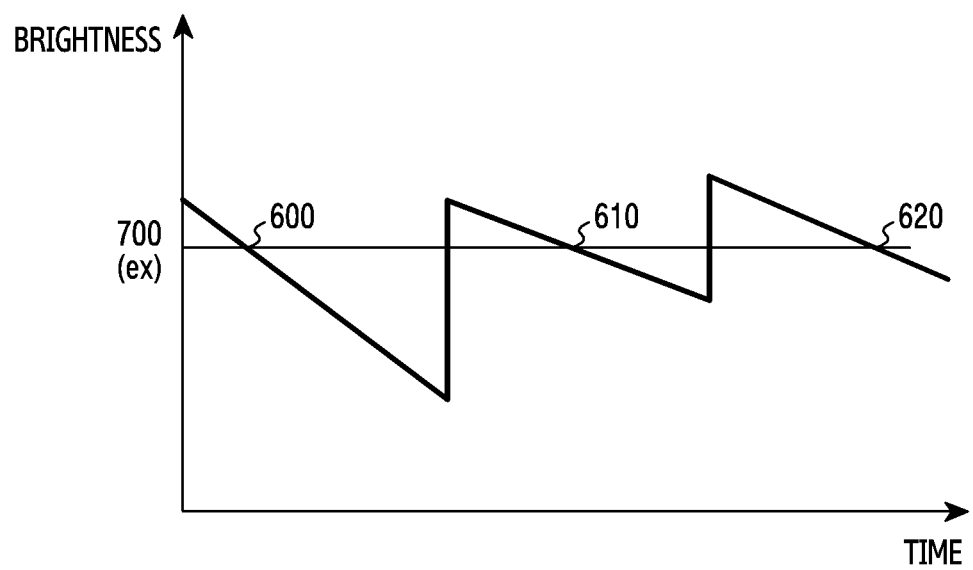

FIG. 6 is a view and a graph illustrating a case where a grayscale value of a screen displayed in a non-sensing area is changed in order to increase the brightness of a sensing area in an electronic device 101 according to an embodiment of the present disclosure.

Referring to FIG. 6, the electronic device 101 (or the processor 120) may execute a specified user authentication system (e.g., a biometric authentication system) in response to occurrence of a user authentication event. In this case, guide information (e.g., a fingerprint icon, text, and the like) for guiding the user to make an input into the sensing area may be displayed on a portion of the screen of the display 160.

According to an embodiment, when the user input is received through the sensing area, the electronic device 101 may perform a process such that at least one pixel corresponding to the sensing area emits light at a specified level of brightness, thereby irradiating light onto the user's body (e.g., a finger). In this case, the electronic device 101 may sense the light reflected by the body to measure the brightness of the pixel (or a group of pixels) corresponding to the sensing area.

According to an embodiment, when the measured brightness is equal to or greater than a reference level of brightness (e.g., 700 nits), the electronic device 101 may perform a biometric authentication operation using the light generated by the at least one pixel corresponding to the sensing area. In addition, the electronic device 101 may determine whether or not the at least one pixel corresponding to the sensing area has deteriorated. For example, if the brightness of the pixel corresponding to the sensing area falls below a specific level (e.g., the reference level of brightness), the electronic device may determine that deterioration has occurred.

According to an embodiment, when the measured brightness is confirmed to be less than a reference level of brightness (e.g., 700 nits) (see 600), the electronic device 101 may output a screen in the non-sensing area using a first level of low-grayscale value (see 602). In this case, the sensing area, based on a load effect, may emit light with a higher brightness level.

According to an embodiment, the electronic device 101 may perform a biometric authentication operation using the brighter light caused by the load effect, if the brighter light is at a brightness level higher than the reference level. In addition, when deterioration further occurs in the at least one pixel corresponding to the sensing area, the electronic device 101 may change the level of low-grayscale value in the screen in the non-sensing area. For example, when the measured brightness is lower than the reference level of brightness because of the occurrence of additional deterioration (see 610 and 620), the electronic device 101 may display the screen in the non-sensing area using a second level of low-grayscale value or a third level of low-grayscale value (see 612 and 622). Thus, the screen output to the non-sensing area may be gradually darkened.

Figure 7:
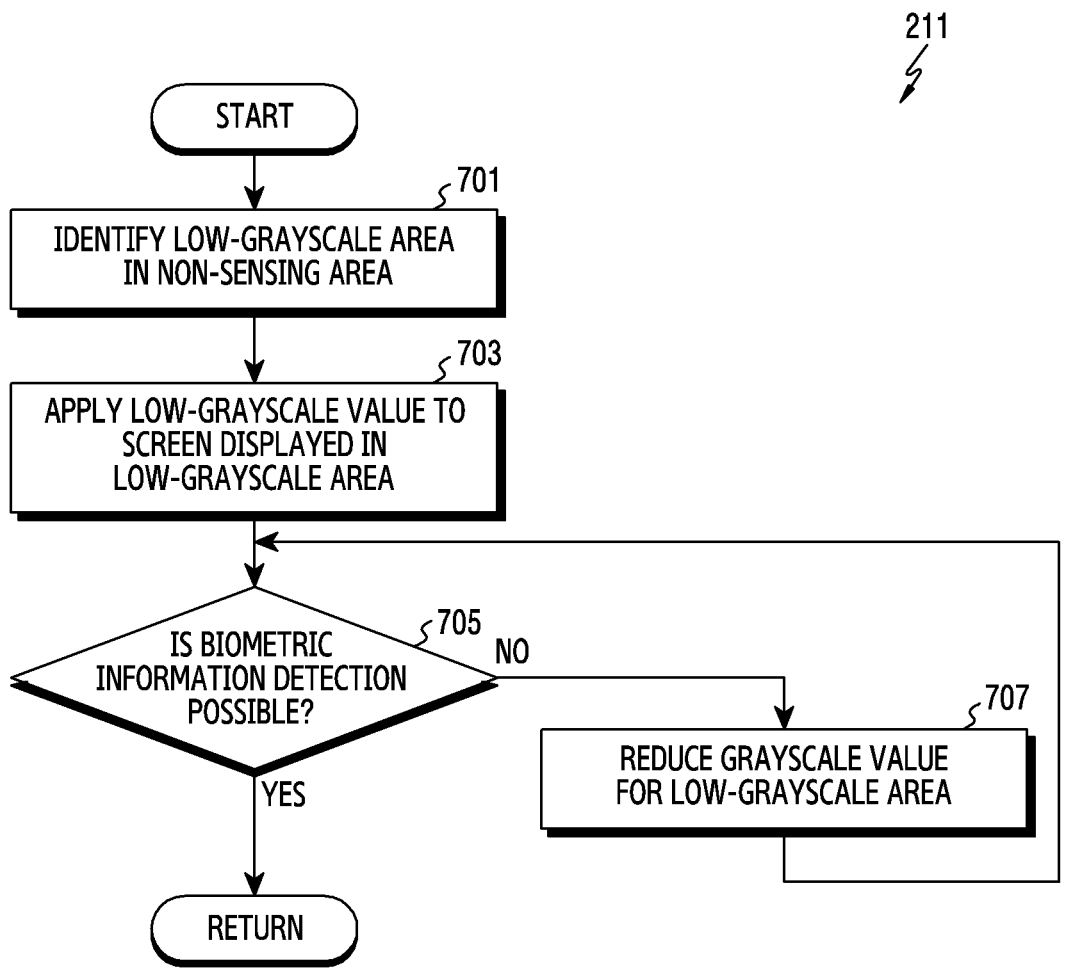
FIG. 7 is a flowchart illustrating another procedure for increasing the brightness of a sensing area in an electronic device according to an embodiment of the present disclosure.
Figure 8:
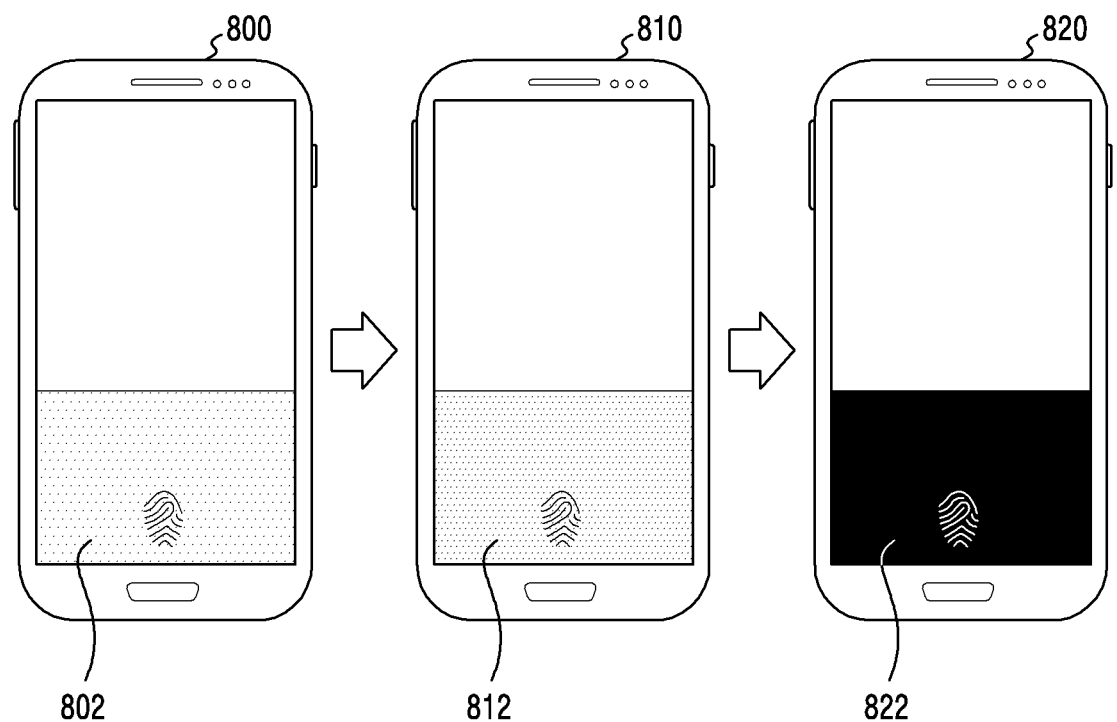
FIG. 8 is a view illustrating a case where a grayscale value of a portion of a screen displayed in a non-sensing area is changed in order to increase the brightness of a sensing area in an electronic device according to an embodiment of the present disclosure.

FIG. 7 is a flowchart illustrating another procedure for increasing the brightness of a sensing area in an electronic device 101 according to an embodiment of the present disclosure. FIG. 8 is a view illustrating a case where a grayscale value of a portion of a screen displayed in a non-sensing area is changed in order to increase the brightness of a sensing area. The embodiment shown in FIGS. 7-8 may be another detailed embodiment of the operation 211 as shown in FIG. 2.

Referring to FIG. 7, the electronic device 101 (or the processor 120) may identify a low-grayscale area of a non-sensing area in operation 701. According to an embodiment, the non-sensing area may be at least a partial area of the screen area of the display 160, which is not the sensing area. Further, the low-grayscale area may be an area to be displayed in a low-grayscale state in the screen displayed in the non-sensing area. For example, the low-grayscale area may be at least a portion of the non-sensing area. In addition, the low-grayscale area may be disposed adjacent to the sensing area.

In operation 703, the electronic device 101 may output a portion of the screen displayed in the non-sensing area to be dark. According to an embodiment, the electronic device 101 may output (e.g., output in the gray state) a portion, which corresponds to the low-grayscale area of the screen displayed in the non-sensing area, to be dark. For example, the above operation may include allowing at least one pixel corresponding to the low-grayscale area to emit light at a specified low-grayscale value. In this case, based on the load effect, the sensing area may emit light with a higher level of brightness.

In operation 705, the electronic device 101 may determine whether or not detection of biometric information is possible. According to an embodiment, the detectability of biometric information may be determined based on whether or not light having a brightness of a specific level or more is reflected by the user's body when the screen is displayed in the non-sensing area using the low grayscale value. For example, when the light having a brightness of a specific level or more is reflected by the body due to the generation of the load effect, the electronic device 101 may determine that detection of biometric information is possible. However, if light having a brightness lower than the specific level is reflected by the body even when the load effect is generated, the electronic device 101 may determine that detection of biometric information is impossible.

If it is determined that detection of biometric information is possible, the electronic device 101 may perform biometric information authentication. For example, the biometric information authentication may include acquiring biometric information using the emitted light having increased brightness as a light source. The biometric information authentication may also include an operation of comparing the acquired biometric information with a registered reference template of a user.

If it is determined that detection of biometric information is impossible, the electronic device 101 may perform an operation of reducing the grayscale value for the low-grayscale area in operation 707. According to an embodiment, this operation may include outputting a darker image in the low-grayscale area using the lower grayscale values. In this case, the brightness may be increased because the load effect on the sensing area is increased. According to an embodiment, when the grayscale value for the screen is reduced (e.g., operation 707), the electronic device 101 may store the reduced grayscale value in the electronic device 101 (e.g., the memory 130) or an external device. When performing the next sensing operation, the electronic device 101 may display the screen in the non-sensing area using the reduced grayscale value.

When the grayscale value for the screen is reduced, the electronic device 101 may determine whether or not detection of biometric information is possible, and based on the determination result, may perform a biometric information authentication operation. For example, when biometric information is acquired using the emitted light having increased brightness as a light source, the electronic device 101 may perform biometric information authentication. In addition, when the electronic device 101 cannot acquire the biometric information using the emitted light having increased brightness as a light source, the electronic device 101 may repeatedly perform the operation of reducing the grayscale value for the screen. For example, as shown in FIG. 8, the electronic device 101 may output a screen 802 corresponding to the low-grayscale area using a first level of low-grayscale value (see 800), thereby increasing the brightness for the sensing area to a first level. In addition, when it is impossible to perform the biometric information authentication operation using the first level of brightness, the electronic device 101 may output a screen 812 corresponding to the low-grayscale area using a second level of low-grayscale value (see 810), thereby increasing the brightness for the sensing area to a second level. Further, when it is impossible to perform the biometric information authentication operation using the second level of brightness, the electronic device 101 may output a screen 822 corresponding to the low-grayscale area using a third level of low-grayscale value (see 820), thereby increasing the brightness for the sensing area to a third level.

Figure 9:
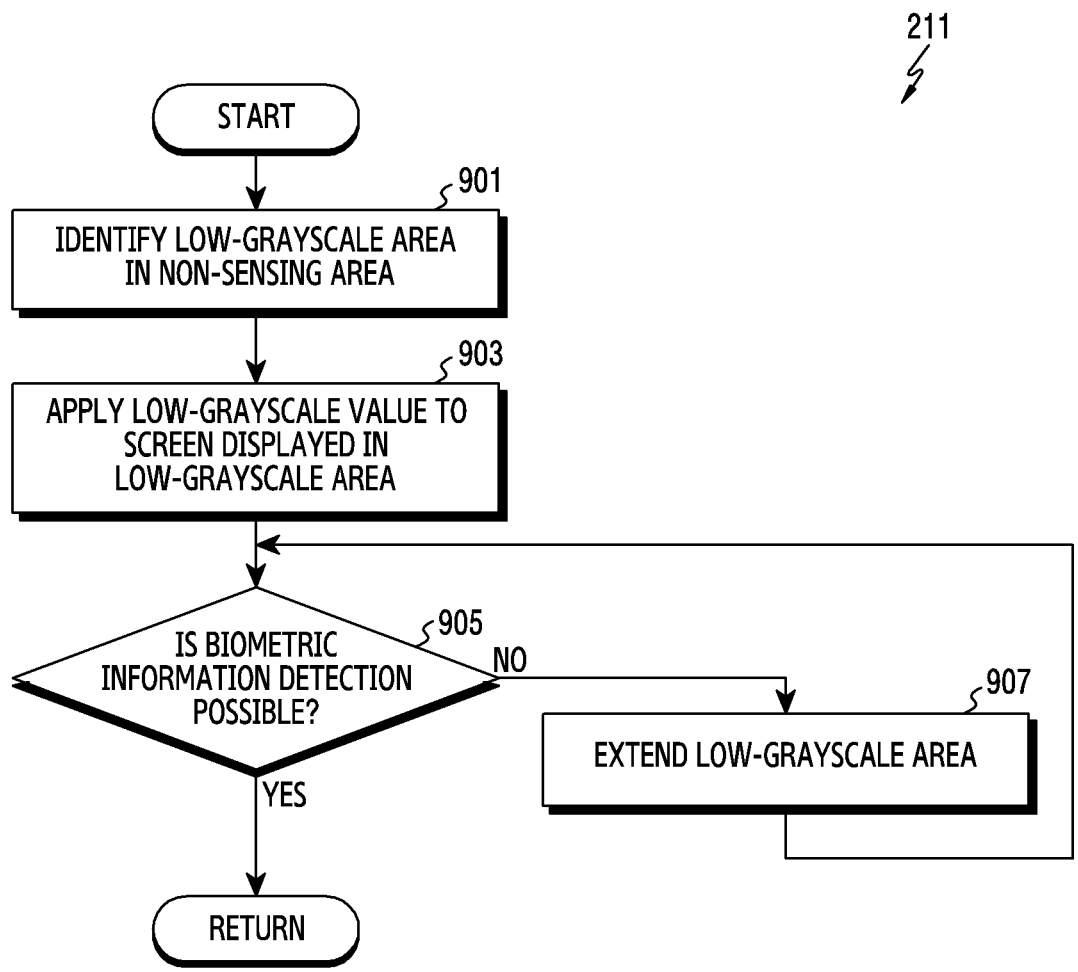
FIG. 9 is a flowchart illustrating another procedure for increasing the brightness of a sensing area in an electronic device according to an embodiment of the present disclosure.
Figure 10:
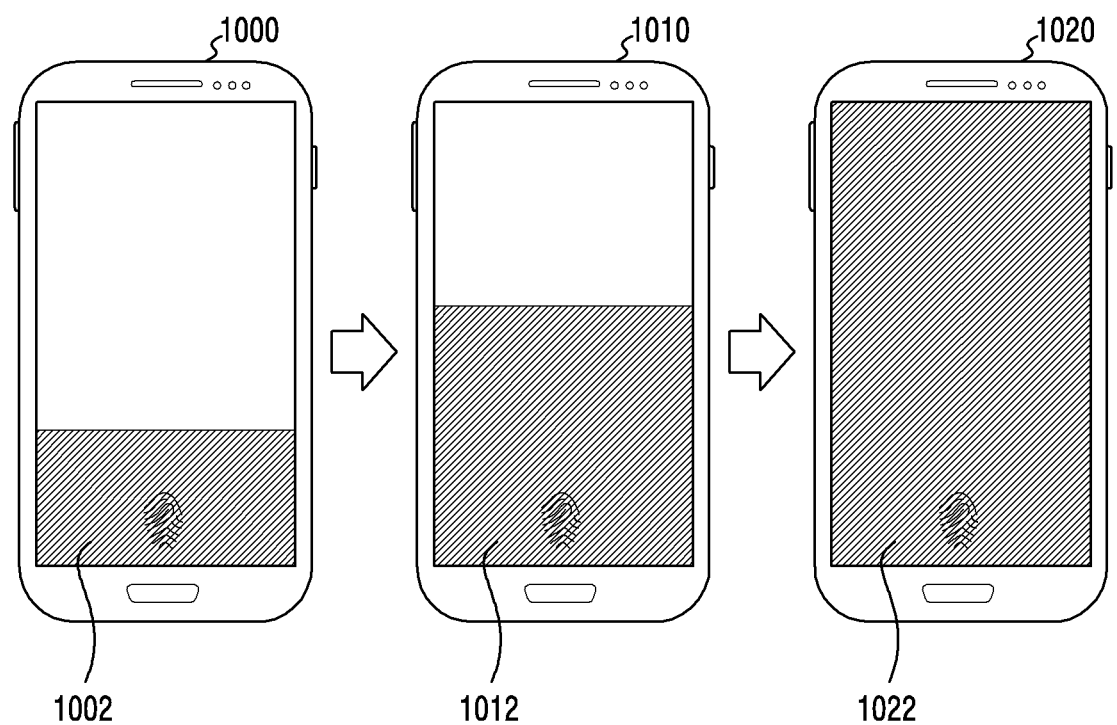
FIG. 10 is a view illustrating a screen area in which a grayscale value is changed in order to increase the brightness of a sensing area in an electronic device according to an embodiment of the present disclosure.

FIG. 9 is a flowchart illustrating another procedure for increasing the brightness of a sensing area in an electronic device 101 according to an embodiment of the present disclosure. FIG. 10 is a view illustrating a screen area in which a grayscale value is changed in order to increase the brightness of a sensing area. The embodiment shown in FIGS. 9-10 may be another detailed embodiment of the operation 211 as shown in FIG. 2.

Referring to FIG. 9, the electronic device 101 (or the processor 120) may identify a low-grayscale area of a non-sensing area in operation 901. According to an embodiment, the non-sensing area may be at least a portion of the screen area of the display 160, excluding the sensing area. Further, the low-grayscale area may be an area to be displayed in a low-grayscale state in the screen displayed in the non-sensing area. For example, the low-grayscale area may be at least a portion of the non-sensing area. In addition, the low-grayscale area may be disposed adjacent to the sensing area.

In operation 903, the electronic device 101 may output a portion of the screen displayed in the non-sensing area to be dark. According to an embodiment, the electronic device 101 may output (e.g., output in the gray state) a portion, which corresponds to the low-grayscale area of the screen displayed in the non-sensing area, to be dark. For example, the above operation may include allowing at least one pixel corresponding to the low-grayscale area to emit light at a specified low-grayscale value. In this case, based on the load effect, the sensing area may emit light at a high level of brightness.

In operation 905, the electronic device 101 may determine whether or not detection of biometric information is possible. According to an embodiment, the detectability of biometric information may be determined based on whether or not light having a brightness of a specific level or more is reflected by the user's body when the screen is displayed in the non-sensing area using the low grayscale value. For example, when the light having a brightness of a specific level or more is reflected by the body due to the generation of the load effect, the electronic device 101 may determine that detection of biometric information is possible. However, if the light having a brightness value lower than the specific level is reflected by the body even when the load effect is generated, the electronic device 101 may determine that detection of biometric information is impossible.

If it is determined that detection of biometric information is possible, the electronic device 101 may perform biometric information authentication. For example, the biometric information authentication may include acquiring biometric information using the emitted light with increased brightness as a light source. The biometric information authentication may also include an operation of comparing the acquired biometric information with a registered reference template of a user.

If it is determined that detection of biometric information is impossible, the electronic device 101 may extend the low-grayscale area of the non-sensing area in operation 907. According to an embodiment, extending the low-grayscale area may include extending the area that is darkly output in the screen displayed in the non-sensing area. In this case, the brightness of the sensing area may be increased because the load effect on the sensing area is increased. According to an embodiment, when the low-grayscale area of the non-sensing area is extended (e.g., operation 907), the electronic device 101 may store information on the extended low-grayscale area in the electronic device 101 (e.g., the memory 130) or an external device. When performing the next sensing operation, the electronic device 101 may identify the low-grayscale area in the non-sensing area using the pre-stored information on the extended low-grayscale area (e.g., operation 901).

When the low-grayscale area is extended, the electronic device 101 may determine whether or not detection of biometric information is possible, and based on the determination result, may perform a biometric information authentication operation. For example, when biometric information is acquired using the emitted light with increased brightness as a light source, the electronic device 101 may perform biometric information authentication. In addition, when the electronic device 101 cannot acquire the biometric information using the emitted light with increased brightness as a light source, the electronic device 101 may repeatedly perform the operation of extending the low-grayscale area. For example, as shown in FIG. 10, the electronic device 101 may output a screen 1002 corresponding to the low-grayscale area having a first area using a low grayscale value (see 1000), thereby increasing the brightness of the sensing area to a first level. In addition, when it is impossible to perform the biometric information authentication operation using the first level of brightness, the electronic device 101 may output a screen 1012 in which the low-grayscale area is extended from the first area to the second area (see 1010), thereby increasing the brightness of the sensing area to a second level. When it is impossible to perform the biometric information authentication operation using the second level of brightness, the electronic device 101 may output a screen 1022 in which the low-grayscale area is extended from the second area to the third area (see 1020), thereby increasing the brightness of the sensing area from to a third level to perform the biometric information authentication operation.

Figure 11:
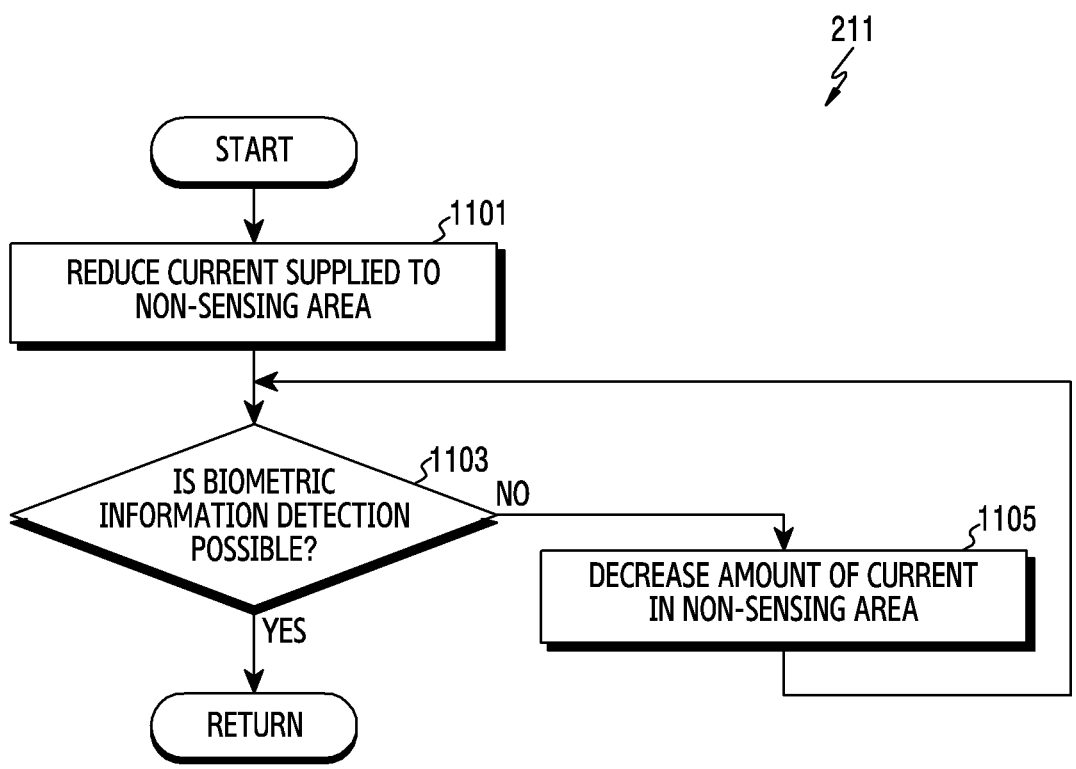
FIG. 11 is a flowchart illustrating another procedure for increasing the brightness of a sensing area in an electronic device according to an embodiment of the present disclosure.

FIG. 11 is a flowchart illustrating another procedure to increase the brightness of a sensing area in an electronic device 101 according to an embodiment of present disclosure. The embodiment shown in FIG. 11 may be another detailed embodiment of operation 211 shown in FIG. 2.

Referring to FIG. 11, the electronic device 101 (or the processor 120) may reduce the current supplied to the non-sensing area in operation 1101. According to an embodiment, in reducing a load effect, the electronic device 101 may prevent a voltage drop caused by a current component flowing through each pixel of the display 160 and a resistance component thereof. Reducing the current supplied to the non-sensing area may be associated with deactivating the components of the electronic device 101 that reduces the load effect in the non-sensing area. By reducing the current supplied to the non-sensing area, the sensing area, based on the load effect, may emit light at a high level of brightness.

In operation 1103, the electronic device 101 may determine whether or not detection of biometric information is possible in the state in which the current supplied to the non-sensing area is reduced. According to an embodiment, the detectability of biometric information may be determined based on whether or not light having a brightness of a specific level or more is reflected by the user's body when the load effect is generated. For example, when light having a brightness of a specific level or more is reflected by the user's body, the electronic device 101 may determine that detection of biometric information is possible. However, if light having a brightness lower than a specific level is reflected by the body even when the load effect is generated, the electronic device 101 may determine that detection of biometric information is impossible.

If it is determined that detection of biometric information is possible, the electronic device 101 may perform biometric information authentication. For example, the biometric information authentication may include acquiring biometric information using the emitted light with an increased brightness as a light source. The biometric information authentication may also include an operation of comparing the acquired biometric information with a registered reference template of a user. According to one embodiment, the electronic device 101 may perform a process such that the deactivated components of the electronic device 101 that reduces the load effect is reactivated after performing the biometric information authentication.

If it is determined that detection of biometric information is impossible, the electronic device 101 may further decrease the amount of current for the non-sensing area in operation 1105. According to an embodiment, further decreasing the amount of current in the non-sensing area may cause an increase in the load effect that affects the sensing area.

When the amount of current for the non-sensing area is further decreased, the electronic device 101 may determine whether or not detection of biometric information is possible, and based on the determination result, may perform a biometric information authentication operation. For example, when biometric information is acquired using the emitted light with increased brightness as a light source, the electronic device 101 may perform a biometric information authentication operation. In addition, when the electronic device 101 cannot acquire the biometric information using the emitted light with increased brightness as a light source, the electronic device 101 may repeatedly perform the operation of further decreasing the amount of current for the non-sensing area.

According to an embodiment, when the amount of current in the non-sensing area is decreased (e.g., operation 1105), the electronic device 101 may store information regarding the reduced amount of current in the electronic device 101 (e.g., the memory 130) or an external device. When performing the next sensing operation, based on information regarding the reduced amount of current, the electronic device 101 may determine the amount of current supplied to the non-sensing area.

Figure 12:
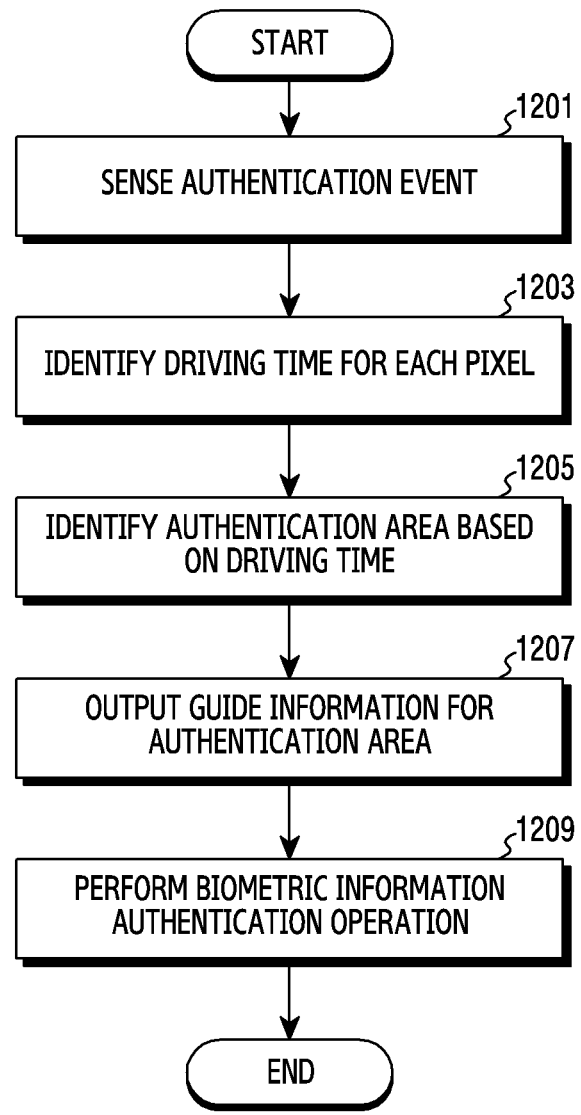
FIG. 12 is a flowchart illustrating another procedure for acquiring biometric information in an electronic device according to an embodiment of the present disclosure.

FIG. 12 is a flowchart illustrating another procedure to acquire biometric information in an electronic device 101 according to an embodiment of the present disclosure.

Referring to FIG. 12, the electronic device 101 (or the processor 120) may sense a user authentication event in operation 1201. According to an embodiment, the user authentication event may be associated with a lock screen release process, a payment process based on electronic payment, or a financial transaction process through mobile banking.

In operation 1203, the electronic device 101 may identify a driving time for each pixel included in the display 160. According to an embodiment, the driving time for each pixel may include the time period for which each pixel emits light. For example, the light emission time for each pixel may be accumulated to then be stored in the electronic device 101 (e.g., the memory 130). The light emission time for each pixel in the area for acquiring biometric information may be estimated based on the number of light emissions of the biometric sensor, the light emission time of the biometric sensor, or the display time of a low-grayscale image for the load effect.

In operation 1205, the electronic device 101, based on the driving time, may identify an authentication area (e.g., a sensing area). According to an embodiment, the authentication area may be at least a portion of an area overlapping the biometric sensor 140 for acquiring biometric information in the display 160. In addition, the authentication area may correspond to the position of a pixel (or a group of pixels) capable of emitting light having a brightness of a reference level or more, which is necessary for detecting biometric information. The authentication area may have the area or size of a specified ratio, and may be implemented in various shapes such as a rectangle, an ellipse, or a fingerprint pattern.

In operation 1207, the electronic device 101 may output guide information on the authentication area. According to an embodiment, the guide information may include information to indicate an area with which at least a part of a user's body must be close to or come into contact with in order to authenticate biometric information. For example, the guide information may be implemented in the form of voice, text, images, icons, and the like. In addition, according to one embodiment, the electronic device 101 may further perform an operation of increasing the brightness of the portion of the display corresponding to the authentication area. For example, the electronic device may perform controls such that load effect occurs in at least a portion of the sensing area.

In operation 1209, the electronic device 101 may perform a biometric information authentication operation. According to an embodiment, the biometric information authentication operation may include an operation of acquiring biometric information using the light of pixel(s) corresponding to the authentication area as a light source. In addition, the biometric information authentication operation may include an operation of comparing the acquired biometric information with a registered reference template of a user.

Figure 13:
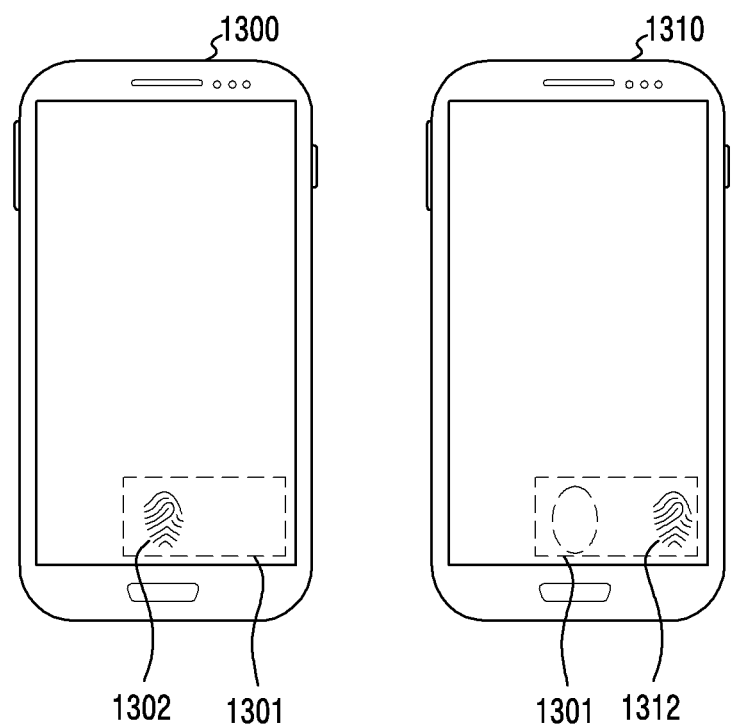
FIG. 13 is a view illustrating a case of changing a sensing area based on deterioration of a display in an electronic device according to an embodiment of the present disclosure.

FIG. 13 is a view illustrating a case of changing, based on deterioration of a display 160, a sensing area in an electronic device 101 according to an embodiment of the present disclosure.

Referring to FIG. 13, the electronic device 101 (or the processor 120) may execute a specified user authentication system (e.g., a biometric authentication system) in response to occurrence of a user authentication event. In this case, at least a portion of the display 160 may be designated as an authentication area (e.g., a biometric information sensing area) with which at least a part of the user's body must be close to or come into contact with for biometric authentication. For example, at least a partial area of the display 160 may be a portion of an area 1301 in which a light receiver for receiving the light reflected by at least a part of the user's body is disposed.

According to an embodiment, the electronic device 101 may identify an authentication area by checking the driving time for each pixel included in at least a partial area of the display 160. For example, the authentication area may be a first partial area corresponding to the position of a pixel (or a group of pixels) driven for less than a reference time, where the pixel (or a group of pixels) are among the pixels included in at least a partial area of the display 160. For example, as indicated by the reference numeral 1300 in FIG. 13, the electronic device 101 may use, as an authentication area, a first partial area 1302, which corresponds to positions of the pixels driven for less than a reference time, thereby delaying deterioration of the display 160.

According to an embodiment, the electronic device 101 may identify the driving time of the pixels corresponding to the authentication area continuously, periodically, or when a specified condition is satisfied. In addition, when the driving time of the pixels corresponding to the authentication area exceeds a reference time, the electronic device 101 may change the position of the authentication area. For example, the position of the authentication area may be changed to correspond to the positions of other pixels driven for less than the reference time. For example, the electronic device 101, as indicated by the reference numeral 1310 in FIG. 13, may use, as a new authentication area, a second partial area 1312 different from the first partial area 1302 of the display 160. The second partial area 1312 may correspond to positions of other pixels driven for less than the reference time, thereby delaying deterioration of the display 160 and improving the biometric information recognition rate.

According to an embodiment, an operating method of an electronic device 101 may include: identifying a request for acquisition of biometric information; based at least in part on the request, identifying state information related to the acquisition of the biometric information; and if the state information satisfies a specified condition, performing a first acquisition of the biometric information using light emitted through a second area of a display 160, wherein the light emitted through the second area has a specified level of brightness, and wherein the performing of the first acquisition of the biometric information may include adjusting an intensity of light emitted through a first area of the display 160 to be lower than the specified level of brightness.

According to an embodiment, the operating method of the electronic device 101 may further include, if the state information satisfies another specified condition, performing a second acquisition of the biometric information using light emitted through the second area of the display 160.

According to an embodiment, the performing of the first acquisition of the biometric information may include driving the first area of the display 160 to emit light corresponding to a specified color.

According to an embodiment, the performing of the first acquisition of the biometric information may include adjusting the intensity of the light emitted through the first area by applying a specified grayscale value to the first area of the display 160.

According to an embodiment, the performing of the first acquisition of the biometric information may include adjusting the intensity of the light emitted through the first area by changing a grayscale value applied to some of pixels in the first area of the display 160.

According to an embodiment, the performing of the first acquisition of the biometric information may include: selecting at least one pixel in the first area of the display 160; and adjusting the intensity of the light emitted through the first area by applying a specified grayscale value to the selected pixel.

According to an embodiment, the state information may include information related to at least one of a luminescence intensity of at least one pixel of the display, a temperature of the at least one pixel, or an ambient environmental brightness around the electronic device 101.

According to an embodiment, the operating method of the electronic device 101 may further include selecting a location of the second area based on a driving time for the pixels in the second area of the display 160. According to an embodiment, the operating method of the electronic device 101 may further include outputting guide information corresponding to the selected location of the second area.

FIG. 14 is a block diagram of an electronic device 1401 in a network environment 1400 for acquiring biometric information using display light according to an embodiment of the present disclosure.

Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420 (e.g., the processor 120 in FIG. 1A), memory 1430 (e.g., the memory 130 in FIG. 1A), an input device 1450, a sound output device 1455, a display device 1460 (e.g., the display 160 in FIG. 1A), an audio module 1470, a sensor module 1476, an interface 1477, a haptic module 1479, a camera module 1480, a power management module 1488, a battery 1489, a communication module 1490 (e.g., the communication interface 170 in FIG. 1A), a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., via a wire) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., via a wire) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via a wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a display comprising one or more pixels, each pixel comprising one or more subpixels, and the display configured to comprise a first area and a second area;
    a display driver IC configured to control driving of the display;
    a biometric sensor configured to at least partially overlap the second area, and configured to acquire biometric information; and
    a processor,
    wherein the processor is configured to:
        identify a request for acquisition of the biometric information;
        based at least in part on the request, identify state information related to the acquisition of the biometric information; and
        if the state information satisfies a specified condition, perform a first acquisition of the biometric information using light emitted through the second area, and
    wherein in performing the first acquisition of the biometric information, the processor is further configured to adjust an intensity of light emitted through the first area to be lower than before identifying the request for acquisition of the biometric information.

2. The electronic device of claim 1, wherein the processor is further configured to, if the state information satisfies another specified condition, perform a second acquisition of the biometric information using the light emitted through the second area.

3. The electronic device of claim 1, wherein the processor is further configured to control the display driver IC to drive the first area to emit light corresponding to a specified color during the first acquisition of the biometric information.

4. The electronic device of claim 1, wherein the processor is further configured to adjust the intensity of the light emitted through the first area by applying a specified grayscale value to the first area during the first acquisition of the biometric information.

5. The electronic device of claim 1, wherein the processor is further configured to adjust the intensity of the light emitted through the first area by changing a grayscale value applied to some of the pixels in the first area during the first acquisition of the biometric information.

6. The electronic device of claim 1, wherein, during the first acquisition of the biometric information, the processor is further configured to:
    select at least one pixel in the first area; and
    adjust the intensity of the light emitted through the first area by applying a specified grayscale value to the selected pixel.

7. The electronic device of claim 1, wherein the state information comprises information related to at least one of a luminescence intensity of at least one pixel of the display, a temperature of the at least one pixel, or an ambient environmental brightness around the electronic device.

8. The electronic device of claim 1, wherein the processor is further configured to select a location of the second area based on a driving time for pixels in the second area.

9. The electronic device of claim 8, wherein the processor is further configured to output guide information corresponding to the selected location of the second area.

10. A method of operating an electronic device, the method comprising:
    identifying a request for acquisition of biometric information;
    based at least in part on the request, identifying state information related to the acquisition of the biometric information; and
    if the state information satisfies a specified condition, performing a first acquisition of the biometric information using light emitted through a second area of a display,
    wherein the performing of the first acquisition of the biometric information comprises adjusting an intensity of light emitted through a first area of the display to be lower than before the identifying the request for acquisition of the biometric information.

11. The method of claim 10, further comprising, if the state information satisfies another specified condition, performing a second acquisition of the biometric information using the light emitted through the second area of the display.

12. The method of claim 10, wherein the performing of the first acquisition of the biometric information comprises driving the first area of the display to emit light corresponding to a specified color.

13. The method of claim 10, wherein the performing of the first acquisition of the biometric information comprises adjusting the intensity of the light emitted through the first area by applying a specified grayscale value to the first area of the display.

14. The method of claim 10, wherein the performing of the first acquisition of the biometric information comprises adjusting the intensity of the light emitted through the first area by changing a grayscale value applied to some of pixels in the first area of the display.

15. The method of claim 10, wherein the performing of the first acquisition of the biometric information comprises:
    selecting at least one pixels in the first area of the display; and
    adjusting the intensity of the light emitted through the first area by applying a specified grayscale value to the selected pixel.

16. The method of claim 10, wherein the state information comprises information related to at least one of a luminescence intensity of at least one pixel of the display, a temperature of the at least one pixel, or an ambient environmental brightness around the electronic device.

17. The method of claim 10, further comprising selecting a location of the second area based on a driving time for pixels in the second area of the display.

18. The method of claim 17, further comprising outputting guide information corresponding to the selected location of the second area.

19. A non-transitory computer-readable storage medium storing a program for executing the operations of:
- identifying a request for acquisition of biometric information;
- based at least in part on the request, identifying state information related to the acquisition of the biometric information;
- if the state information satisfies a specified condition, performing a first acquisition of the biometric information using light emitted through a second area of a display, wherein the performing of the first acquisition of the biometric information comprises adjusting an intensity of light emitted through a first area of the display to be lower than before the identifying the request for acquisition of the biometric information; and
- if the state information satisfies another specified condition, performing a second acquisition of the biometric information using the light emitted through the second area of the display.

20. The non-transitory computer-readable storage medium of claim 19, wherein, to adjust the intensity of the light emitted through the first area, the operations further comprise driving the first area to emit light corresponding to a specified color or applying a specified grayscale value to the first area.

* * * * *